(12) United States Patent
Masuda

(10) Patent No.: US 8,179,431 B2
(45) Date of Patent: May 15, 2012

(54) COMPOUND EYE PHOTOGRAPHING APPARATUS, CONTROL METHOD THEREFOR, AND PROGRAM

(75) Inventor: Tomonori Masuda, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 550 days.

(21) Appl. No.: 12/410,791

(22) Filed: Mar. 25, 2009

(65) Prior Publication Data

US 2009/0244275 A1  Oct. 1, 2009

(30) Foreign Application Priority Data

Mar. 26, 2008 (JP) ................................ 2008-079637

(51) Int. Cl.
*H04N 13/02* (2006.01)
*H04N 9/47* (2006.01)
(52) U.S. Cl. ................. 348/78; 348/47; 348/48; 348/77
(58) Field of Classification Search .................... 348/42, 348/47–48, 61, 77–78
See application file for complete search history.

(56) References Cited

U.S. PATENT DOCUMENTS

| | | | | |
|---|---|---|---|---|
| 6,690,451 | B1* | 2/2004 | Schubert | 356/3.14 |
| 6,999,896 | B2 | 2/2006 | Takahashi | |
| 7,659,921 | B2* | 2/2010 | Aoyama | 348/135 |
| 2002/0030675 | A1* | 3/2002 | Kawai | 345/204 |
| 2006/0215903 | A1 | 9/2006 | Nishiyama | |
| 2007/0165931 | A1* | 7/2007 | Higaki | 382/128 |
| 2010/0182416 | A1* | 7/2010 | Holmgren et al. | 348/77 |

FOREIGN PATENT DOCUMENTS

JP  2007-110498 A  4/2007

OTHER PUBLICATIONS

Jung-Hwan Ko et al., "Intelligent person identification system using stereo camera-based height and stride estimation", Proceedings of the SPIE, 2005, vol. 5817, No. 1, pp. 85-96, Bellingham, WA, XP002539787.

* cited by examiner

*Primary Examiner* — Joshua Joo
(74) *Attorney, Agent, or Firm* — Birch, Stewart, Kolasch & Birch, LLP.

(57) ABSTRACT

A compound eye photographing apparatus including: a plurality of photographing units for photographing a subject at a plurality of photographing positions to obtain a plurality of images of the subject; a subject detection unit for detecting a predetermined subject from a base image which is one of the plurality of images; a subject information generation unit for generating subject information which includes information of the position and size of the predetermined subject in the base image; a photographing information generation unit for generating photographing information which includes information of the baseline length, convergence angle, focal length, and zoom magnification of each of the plurality of photographing units at the time of photographing, and a determination unit for determining whether or not the predetermined subject detected from the base image is included in another image other than the base image and outputting the determination result.

4 Claims, 4 Drawing Sheets

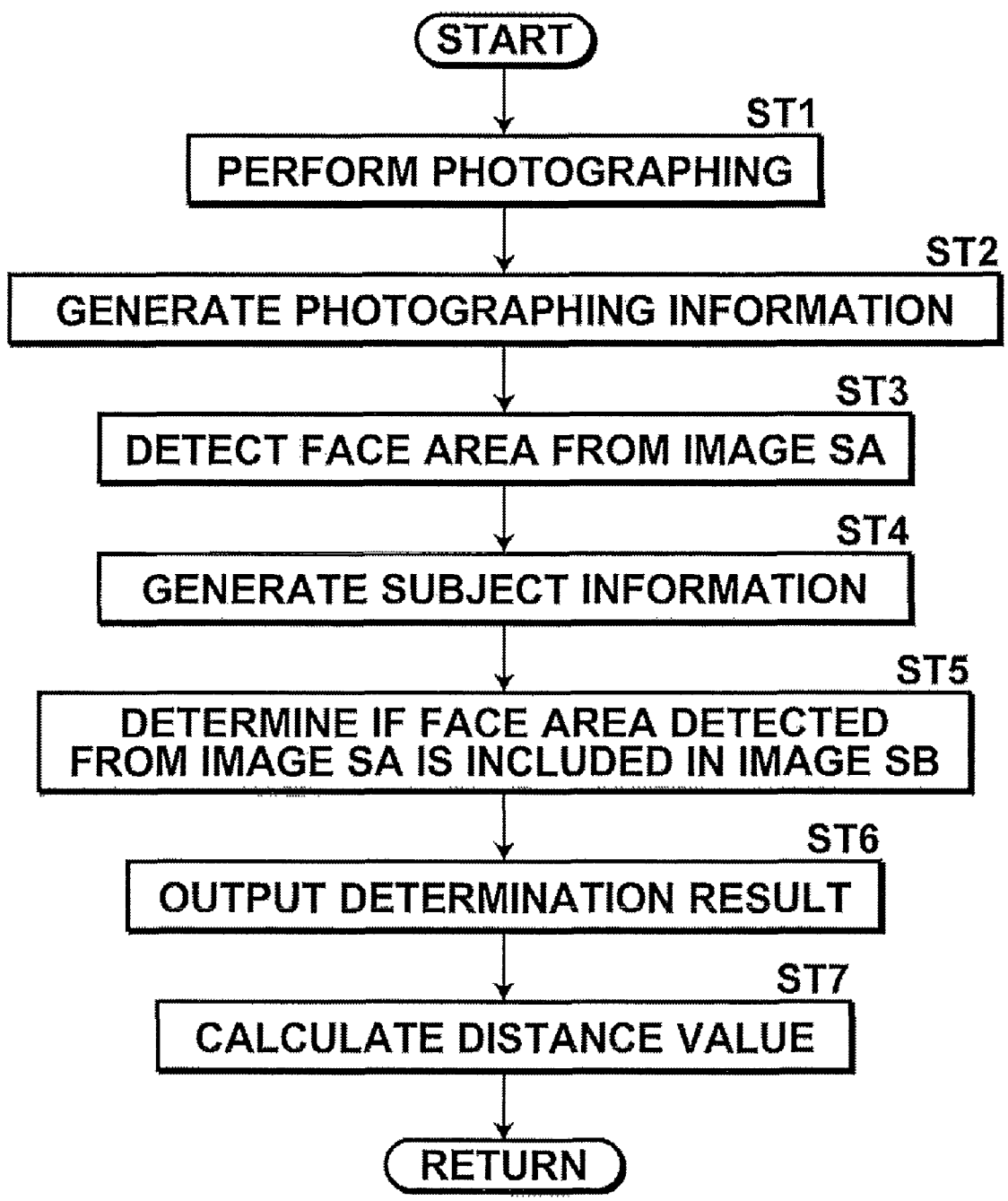

COMPOUND EYE PHOTOGRAPHING APPARATUS, CONTROL METHOD THEREFOR, AND PROGRAM

BACKGROUND OF THE INVENTION

1. Field of the Invention

The present invention relates to a compound eye photographing apparatus for photographing a subject at a plurality of photographing positions and a control method therefor. The invention also relates to a program for causing a computer to perform the control method for the compound eye photographing apparatus.

2. Description of the Related Art

A method for generating a distance image that represents a stereoscopic shape of a subject is proposed. In the method, the subject is photographed by a compound eye camera having a plurality of cameras, then corresponding points, which are pixels corresponding to each other, between a plurality of images (a base image obtained by a base camera and a reference image obtained by a reference camera) obtained by the photographing are searched for (stereo matching), and the distance from the base camera or reference camera to the point on the subject corresponding to the pixel is measured by applying the principle of triangulation to the positional difference (parallax) between the pixel in the base image and the pixel in the reference image corresponding to each other, thereby generating a distance image.

In the mean time, for a compound eye camera, various types of controls, such as focus control, exposure control, photographing control are performed, as well as the distance measurement described above, based on the result of determination if a target subject is included in a plurality of images obtained by the compound eye camera. In order to perform such controls for a compound eye camera, various methods for determining if a target subject, such as a face or the like, is included in a plurality of images obtained by the compound eye camera are proposed. For example, U.S. Pat. No. 6,999,896 (Patent Document 1) describes one of such methods. In the method, a plurality of sensors, namely a compound camera and a millimeter wave radar, is provided, then based on normal error distributions with respect the position and velocity when the same target object is detected by each of the sensors, first and second probabilities that each of the detected objects is the same target object in terms of the position and velocity are calculate from the errors in the identified positions and velocities, and a third probability is calculated based on the first and second probabilities to determine that each of the detected objects is the same target object when the third probability exceeds a predetermined threshold value.

Further, Japanese Unexamined Patent Publication No. 2007-110498 (Patent Document 2) proposes a control method of a compound eye camera in which detection of a specific subject, such as a face or the like, and various controls, including focus control, exposure control, and the like, are performed based on an image obtained by one of a plurality of cameras thereof.

The method described in Patent Document 1, however, requires a sensor other than a compound eye camera which complicates the device configuration. Further, it is necessary to calculate the probabilities which requires a longed time. In the method described in Patent Document 2, various controls are performed based on an image obtained by one camera, thus the controls are performed even when a subject commonly presents in the photographing ranges of all of the cameras is not included in the image. Here, it is often the case that a subject presents in the photographing range of one camera but not in the photographing range of another camera is not so important for the photographer. Consequently, in the method described in Patent Document 2, various controls may sometimes be performed based on a minor subject included only in the image obtained by one camera.

The present invention has been developed in view of the circumstances described above, and it is an object of the present invention to enable simple determination as to whether or not a predetermined common subject, such as a face or the like, is included in a plurality of images obtained by a compound eye photographing apparatus.

SUMMARY OF THE INVENTION

A compound eye photographing apparatus according to the present invention is an apparatus, including:

a plurality of photographing units for photographing a subject at a plurality of photographing positions to obtain a plurality of images of the subject;

a subject detection unit for detecting a predetermined subject from a base image which is one of the plurality of images;

a subject information generation unit for generating subject information which includes information of the position and size of the predetermined subject in the base image;

a photographing information generation unit for generating photographing information which includes information of the baseline length, convergence angle, focal length, and zoom magnification of each of the plurality of photographing units at the time of the photographing; and a determination unit for determining whether or not the predetermined subject detected from the base image is included in another image other than the base image and outputting the determination result.

The term "predetermined subject" as used herein refers to a subject having a small individual difference in size, such as a human face or an automobile.

Where pixel skipping is performed in order to reduce the amount of data, the photographing information may include a skipping rate representing the number of skipped pixels other than the baseline length, convergence angle, focal length, and zoom magnification of each of the plurality of photographing units. Further, where pixel mixing in which one pixel of the image is obtained from a plurality of pixels of the imaging device of the photographing unit is performed in order to increase the pixel value, the photographing information may include a mixing rate representing the number of pixels of the imaging device which forms one pixel of the image. Note that the zoom magnification includes not only the optical zoom magnification using the optical system of the photographing unit but also the electronic zoom magnification in which the image is zoomed by image processing.

A compound eye photographing apparatus control method according to the present invention is a method including the steps of:

photographing a subject at a plurality of photographing positions to obtain a plurality of images of the subject;

detecting a predetermined subject from a base image which is one of the plurality of images;

generating subject information which includes information of the position and size of the predetermined subject in the base image;

generating photographing information which includes information of the baseline length, convergence angle, focal length, and zoom magnification of each of the plurality of photographing units at the time the of photographing; and determining whether or not the predetermined subject detected from the base image is included in another image other than the base image and outputting the determination result.

The compound eye photographing apparatus control method according the present invention may be provided as a program for causing a computer to perform the method.

According to the present invention, a subject is photographed at a plurality of photographing positions to obtain a plurality of images of the subject, then a predetermined subject is detected from a base image which is one of the plurality of images, subject information is generated which includes information of the position and size of the predetermined subject in the base image, photographing information is generated which includes information of the baseline length, convergence angle, focal length, and zoom magnification of each of the plurality of photographing units at the time the of photographing, and a determination is made whether or not the predetermined subject detected from the base image is included in another image other than the base image and the determination result is outputted.

Here, if the individual size difference of the predetermined subject is small, the distance from the photographing unit that obtained the base image (base photographing unit) to the predetermined subject may be calculated from the size thereof in the base image and zoom magnification when the base image was obtained. Further, from the position of the predetermined subject in the base image, focal length, and zoom magnification, an angle (first angle) representing the direction of the predetermined subject with respect to the optical axis of the base photographing unit may be calculated. Still further, from the baseline length, convergence angle of each of the plurality of photographing units and the first angle, an angle (second angle) representing the direction of the predetermined subject with respect to the optical axis of another photographing unit other than the base photographing unit may be calculated. In addition, the field angle of the another photographing unit is already known, so that a determination may be made as to whether or not the predetermined subject is present within the field angle of the another photographing unit other than the base photographing unit, that is, whether or not the predetermined subject is present in another image other than the base image based on whether or not the second angle is within the field angle of the another photographing unit.

Therefore, according to the present invention, a determination may be made as to whether or not a predetermined subject common to a plurality of images without performing complicated calculations as described in Patent Document 1. Further, based on the determination result, various control operations may be performed using the predetermined subject common to the plurality of images which is regarded as important by the photographer.

BRIEF DESCRIPTION OF THE DRAWINGS

FIG. 6 is a flowchart illustrating processing performed in the present embodiment.

DESCRIPTION OF THE PREFERRED EMBODIMENTS

Figure 1:
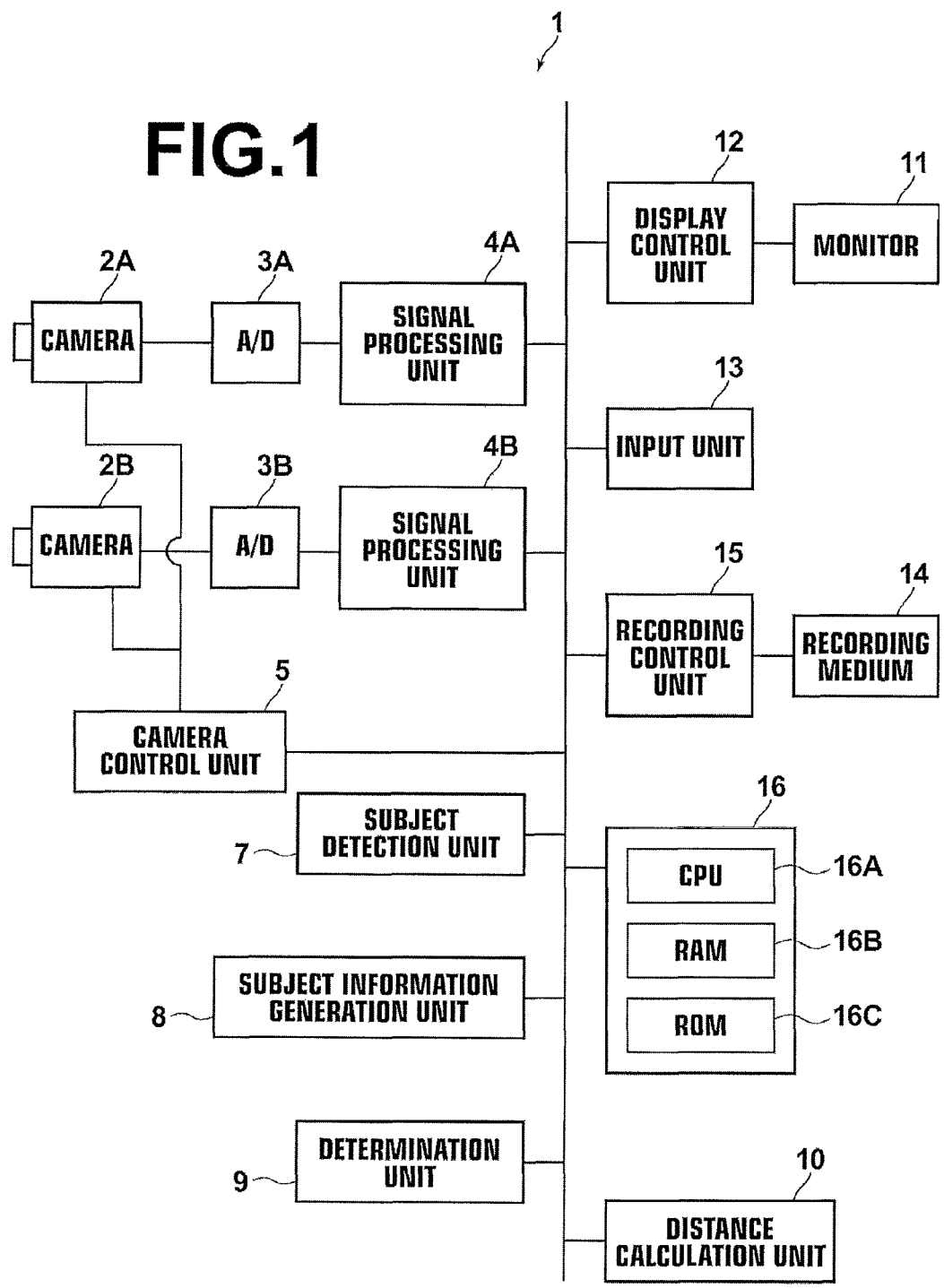
FIG. 1 is a schematic block diagram of a compound eye photographing apparatus according to an embodiment of the present invention, illustrating a configuration thereof.

Hereinafter, an exemplary embodiment of the present invention will be described with reference to the accompanying drawings. FIG. 1 is a schematic block diagram of a compound eye photographing apparatus according to an embodiment of the present invention, illustrating a configuration thereof. As illustrated in FIG. 1, compound eye photographing apparatus 1 according to the present embodiment includes two cameras 2A, 2B, A/D conversion units 3A, 3B, signal processing units 4A, 4B, and camera control unit 5.

Each of cameras 2A, 2B is provided to obtain an image for calculating a distance value. It has an optical system including a taking lens and an imaging device, such as a CCD or the like, and drive-controlled by camera control unit 5 in focus operation and zoom operation using the taking lens, exposure, charge readout timing from the imaging device, and the like. Cameras 2A, 2B are disposed at a predetermined distance, and a baseline length, which is the distance between cameras 2A, 2B, and an angle of convergence, which is an angle formed by the lines of sight of both cameras when focusing on a subject, can be changed. In the present embodiment, the description will be made on the assumption that cameras 2A, 2B photograph motion pictures, but the cameras may be those that photograph through images until a photographing operation is performed and when the photographing operation is performed, photograph still images at that timing. Where motion pictures are photographed, images SA, SB correspond to one frame of the respective motion pictures.

Camera control unit 5 generates photographing information C0 which includes the baseline length, convergence angle, focal length, and zoom magnification of each of cameras 2A, 2B at the time of photographing and outputs photographing information C0 to a determination unit 9 to be described later. Here, the zoom operation may sometimes be performed by both the optical zoom using the optical system of camera 2A and electronic zoom in which the image itself is zoomed, so that the zoom magnification information includes both the optical zoom magnification and electronic zoom magnification. Note that camera control unit 5 corresponds to a photographing information generation unit.

A/D conversion units 3A, 3B convert images SA, SB obtained by respective cameras 2A, 2B by photographing from analog data to digital data.

Signal processing units 4A, 4B perform parallelizing processing for parallelizing two images SA, SB, as well as performing correction processing for correcting variations in the sensitivity distributions of image data and distortions of the optical systems. The signal processing units 4A, 4B further perform image processing on the parallelized images, such as white balance adjustment, tone correction, sharpness correction, color correction, and the like. Note that reference symbols SA, SB used for images prior to the processing by signal processing units 4A, 4B will also be used for the processed images. Further, the correction processing, parallelizing processing, and image processing are hereinafter collectively referred to as signal processing.

The compound eye photographing apparatus 1 further includes subject detection unit 7, subject information generation unit 8, determination unit 9 and distance calculation unit 10.

Subject detection unit 7 detects an area that includes a predetermined subject from image SA (whether before or after the signal processing) obtained by camera 2A by photographing. In the present embodiment, a face is used as the predetermined subject, and subject detection unit 7 detects a face area which includes a face from image SA. As for the method for detecting a face from an image, any method may be used, such as template matching method, method using a face discriminator obtained through machine learning using multitudes of sample images, method that extracts a rectangular area having a skin color and enclosing a face contour shape in an image as a face area, method that extracts an area having a face contour shape as a face area, or the like. Where motion pictures are photographed, images SA, SB correspond to one frame of the respective motion pictures. As such, the face area detection and the subsequent processing may be performed on all of the frames or by skipping some of them.

Figure 2:
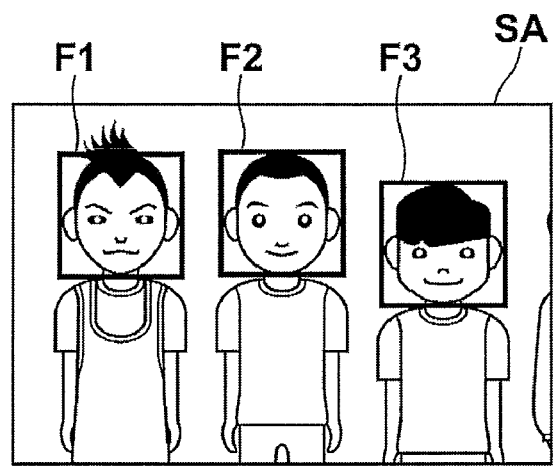
FIG. 2 illustrates face areas detected from images SA, SB in the present embodiment.

FIG. 2 illustrates a face area detection result. As illustrated in FIG. 2, image SA includes three faces and rectangular face areas F1 to F3, each enclosing a face, are detected.

With respect to each face area detected by subject detection unit 7, subject information generation unit 8 generates subject information H0 indicating the position and size in image SA. Here, as the position of a face area, the pixel position of the intersection of diagonal lines of the face area in the horizontal direction of image SA is used, but is not limited to this. The coordinate system of image SA originates from the optical axis of camera 2A. The size of a face area refers to the number of pixels in the height or width direction of the face area.

Determination unit 9 determines whether or not a face included in a face area detected from image SA is included in image SB based on photographing information C0 and subject information H0 and outputs the determination result to distance calculation unit 10.

Figure 3:
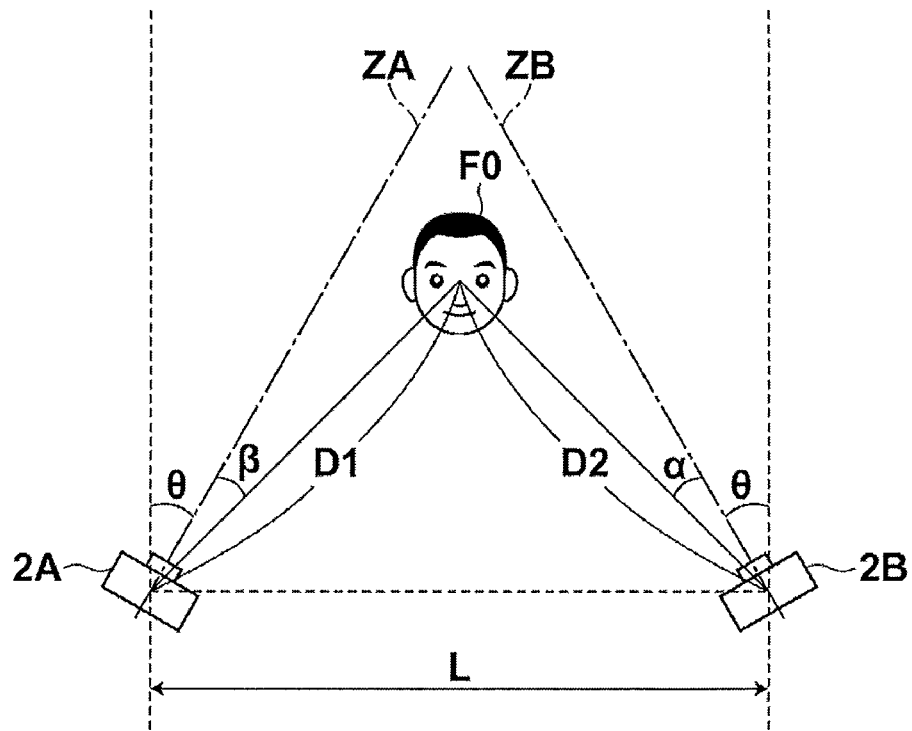
FIG. 3 illustrates determination processing performed by a determination unit.

FIG. 3 illustrates determination processing performed by determination unit 9. FIG. 3 illustrates that face F0 of a person is photographed by cameras 2A, 2B, in which L represents the baseline length of cameras 2A, 2B, θ represents the convergence angle, ZA represents the optical axis of camera 2A, and ZB represents the optical axis of camera 2B.

Using optical zoom magnification B1 and electronic zoom magnification B2 of camera 2A included in photographing information C0, face size FS included in subject information H0, and actual face size FR, determination unit 9 calculate distance D1 from camera 2A to face F0 by Formula (1) below.

$$D1 = FR \times B1 \times B2 / FS \qquad (1)$$

where, as actual face size FR, a predetermined size of a common human face in the height or width direction is used, since individual difference in the human face size is not so significant.

Then, the determination unit 9 calculates angle β which represents the direction of face F0 with respect to optical axis ZA of camera 2A by Formula (2) below.

$$\beta = \arctan((X1 \times P1)/(f1 \times B2)) \qquad (2)$$

where, X1 is the position of the face area in image SA, P1 is the horizontal pixel pitch of the imaging device included in camera 2A, and f1 is the focal length of camera 2A. Here, pixel pitch P1 is stored in ROM 16C of overall control unit 16, to be described later.

Note that Formula (2) above is based on the assumption that the optical system of camera 2A does not have any distortion. Where image SA is an image before signal processing, distortion of the optical system of camera 2A influences and angle β can not be calculated accurately by Formula (2) above. Therefore, in the present embodiment, an arrangement may be adopted in which angles β are calculated with respect to various face area positions X1, various focal lengths f1, and various electronic zoom magnifications B2 in view of distortion of the optical system of camera 2A, then a table that defines the relationship between angles β and various face area positions X1, various focal lengths f1, and various electronic zoom magnifications B2 is generated based on the calculated results, and angle β is obtained by referring to the table. In this case, the table may be stored in ROM 16C. Further, even images SA, SB are those after signal processing, an arrangement may be adopted in which the relationship of angle β with respect to various face area positions X1, focal lengths f1, and electronic zoom magnifications B2 is calculated by Formula (2), then a table that defines the calculated results is stored in ROM 16C, and angle β is obtained by referring to the table.

In the mean time, distance D1 from camera 2A to face F0, distance D2 from camera 2B to face F0, angle β that represents the direction of face F0 with respect to optical axis ZA of camera 2A, angle α that represents the direction of face F0 with respect to optical axis ZB of camera 2B, baseline length L, and convergence angle θ have the relationship represented by Formulae (3) and (4) below.

$$D1 \cos(\theta+\beta) = D2 \cos(\theta+\alpha) \qquad (3)$$

$$D1 \sin(\theta+\beta) + D2 \sin(\theta+\alpha) = L \qquad (4)$$

By eliminating distance D2 from Formulae (3) and (4) as shown in Formula (5) below, angle α may be calculated.

$$\alpha = \arctan((L - D1 \sin(\theta+\beta))/D1 \cos(\theta+\beta)) - \theta \qquad (5)$$

Further, the determination unit 9 calculates field angle γ of camera 2B by Formula (6) below.

$$\gamma = \arctan((XB \times P2)/(f2 \times B3)) \qquad (6)$$

where, XB is the number of pixels in the horizontal direction of the imaging device of camera 2B, P2 is the horizontal pixel pitch of the imaging device included in camera 2B, f2 is the focal length of camera 2B, and B3 is the electronic zoom magnification of camera 2B. Here, the pixel pitch P2 is stored in ROM 16C of overall control unit 16, to be described later.

Note that Formula (6) above is based on the assumption that the optical system of camera 2B does not have any distortion. Where image SB is an image before signal processing, distortion of the optical system of camera 2B influences and field angle γ can not be calculated accurately by Formula (6) above. Therefore, in the present embodiment, an arrangement may be adopted in which field angles γ are calculated with respect to various focal lengths f2 and various electronic zoom magnifications B3 in view of distortion of the optical system of camera 2B, then a table that defines the relationship between field angles γ and various focal lengths f2, and various electronic zoom magnifications B3 is generated based on the calculated results, and field angle γ is obtained by referring to the table. In this case, the table may be stored in ROM 16C. Further, even images SA, SB are those after signal processing, an arrangement may be adopted in which the relationship of field angle γ with respect to various focal lengths f2 and electronic zoom magnifications B3 is calculated by Formula (6), then a table that defines the calculated results is stored in ROM 16C, and field angle γ is obtained by referring to the table.

Then, determination unit 9 determines whether or not face F0 is present within the field angle of camera 2B from field angle γ and angle α, thereby determining whether or not the face included in the face area detected from image SA is included in image SB, and outputs the determination result to distance calculation unit 10. Where face F0 is present within the field angle of camera 2B, the relationship of $|\alpha| < |\gamma/2|$ holds true. Thus, determination unit 9 determines that the face included in the face area detected from image SA is included in image SB when $|\alpha|<|\gamma/2|$, otherwise it determines that the face included in the face area detected from image SA is not included in image SB, and outputs the determination result to distance calculation unit 10.

Figure 4:
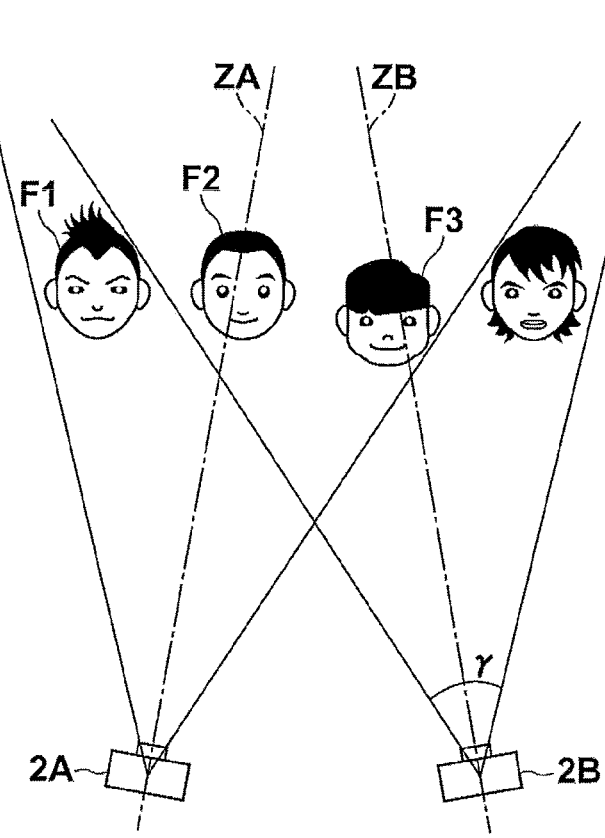
FIG. 4 illustrates a positional relationship between two cameras when photographing.

For example, the positional relationship of faces in face areas F1 to F3 detected as in FIG. 2 is like that shown in FIG. 4 at the time of photographing, only face area F1 among face areas F1 to F3 detected from image SA is not included in image SB. Accordingly, determination unit 9 outputs the determination result that a face corresponding to the face included in face area F1 is not included in image SB, but faces corresponding to the faces in face areas F2 and F3 are included in image SB.

When a face included in a face area detected from image SA is included in image SB, the determination unit 9 detects the face area that includes the face from image SB, and outputs information of the face area (position and size) to distance calculation unit 10 by including the information in the determination result.

Figure 5:
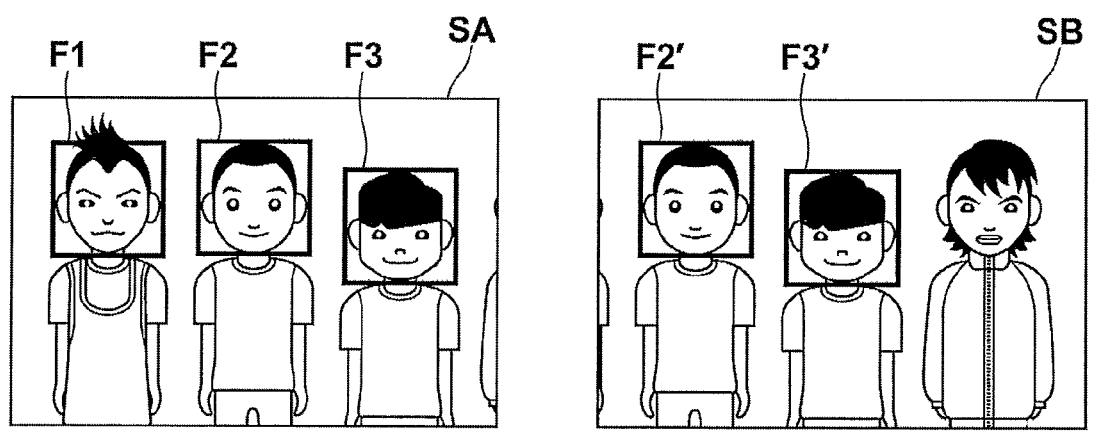
FIG. 5 illustrates detected face areas common to two images.

For example, where a determination is made that faces corresponding to the faces in face areas F2 and F3 among face areas F1 to F3 shown in FIG. 2 are included in image SB, determination unit 9 detects areas of image SB corresponding to face areas F2 and F3 of image SA as face areas corresponding to face areas F2 and F3 respectively by matching each of face areas F2 and F3 with image SB. More specifically, while moving each of face areas F2 and F3 on image SB, the determination unit 9 calculates the correlation between each of face areas F2 and F3 and pixel SB, and areas having a correlation greater than a threshold value are determined as face areas F2' and F3' corresponding to face areas F2 and F3 respectively, and outputs information of detected face areas F2' and F3' (positions and sizes) to distance calculation unit 10 by including the information in the determination result. The detection result of face areas F2' and F3' is illustrated in FIG. 5.

Distance calculation unit 10 is provided to measure the distance from each of cameras 2A, 2B to a common subject included in the photographing ranges of cameras 2A, 2B. First, the unit obtains corresponding points corresponding to each other between corresponding face areas in images SA, SB obtained by cameras 2A, 2B using a stereo matching method. For example, distance calculation unit 10 obtains the corresponding points by cutting out a partial matrix (e.g., 3×3 pixels) from the corresponding face areas and calculating a correlation value thereof. Then, using the obtained corresponding points, baseline length, convergence angle and zoom magnification of each of cameras 2A, 2B, the unit calculates a distance value representing the distance to a face commonly included in images SA, SB based on the principle of triangulation. More specifically, with respect to all of the pixels in the common face area in images SA, SB, corresponding points between the corresponding face areas are detected on a pixel-by-pixel basis to calculate a parallax, which is the difference between the corresponding points, then the distance value is calculated based on the parallax. A distance image in which each pixel has a distance value may be generated based on the distance value. Further, a stereoscopically viewable stereoscopic image may also be generated from images SA, SB based on the parallax.

Compound eye photographing apparatus 1 further includes monitor 11, such as a liquid crystal display, for displaying images SA, SB, and various types of information; display control unit 12 for controlling display of various types of information on monitor 11; input unit 13 which includes an arrow key, operation buttons, a zoom lever, a release button, and the like; and recording control unit 15 for recording images SA, SB and distance values on recording medium 14, such as a memory card or the like. Still further, compound eye photographing apparatus 1 includes overall control unit 16 which includes CPU 16A, RAM 16B which serves as a work area, and ROM 16C having stored therein operation programs, various setting values and tables used in apparatus 1.

Processing performed in the present embodiment will now be described. FIG. 6 is a flowchart illustrating the processing performed in the present embodiment. In the present embodiment, a human face is the target subject, and it is assumed that at least image SA obtained by camera 2A includes a face.

Overall control unit 16 initiates the processing when a photographing instruction is given, and camera control unit 5 causes cameras 2A, 2B to obtain images SA, SB by photographing the subject (step ST1). Camera control unit 5 also generates photographing information C0 (step ST2). Then, subject detection unit 7 detects a face area from image SA obtained by camera 2A by the photographing (step ST3). Next, subject information generation unit 8 generates subject information H0 (step ST4).

Then, determination unit 9 determines whether or not a face included in the face area detected from image SA is included in image SB based on photographing information C0 and subject information H0 (step ST5), and outputs the determination result to distance calculation unit 10 (step ST6).

Based on the determination result of determination unit 9, distance value calculation unit 10 calculates a distance value of a face area common to images SA, SB (step ST7) and the processing returns to step ST1.

As described above, in the present embodiment, a determination is made as to whether or not a face included in a face area detected from image SA is included in image SB based on photographing information C0 and subject information H0, so that a determination may be made whether or not a face common to images SA, SB is present without performing complicated calculations. Further, based on the determination result, the distance value to the face common to images SA, SB which is regarded as important by the photographer may be calculated.

Further, in the present embodiment, compound eye photographing apparatus 1 includes two cameras 2A, 2B, but the apparatus may include three or more cameras. In this case, a face area is detected from the image obtained by one of the cameras, and photographing information C0 which includes baseline lengths, convergence angles, focal lengths, and zoom magnifications with respect the plurality of cameras, and subject information H0 are generated, and determinations are made as to whether or not the detected face area is included in other images.

Further, in the present embodiment, the determination result is outputted to distance calculation unit 10 to calculate the distance value of a face common to images SA, SB. But an arrangement may be adopted in which the determination result is outputted to camera control unit 5, thereby controlling the focuses of cameras 2A, 2B so as to come into focus on the face common to images SA, SB. Further, exposure of cameras 2A, 2B may be controlled such that the exposure of the face common to images SA, SB becomes identical. Still further, particularly in still image photographing, when a common face area appears in through images obtained by cameras 2A, 2B, photographing may be performed by cameras 2A, 2B. In this case, expression of the face area may be detected and when the face included in the face area has a specific expression, such as smiling or the like, photographing may be performed by cameras 2A, 2B.

In the mean time, when performing photography, there may be a case where pixel skipping is performed in order to reduce data amounts of images SA, SB, or pixel mixing in which one pixel of images SA, SB is obtained from a plurality of pixels of imaging devices of cameras 2A, 2B is performed in order to increase the pixel value. In such a case, the number of pixels of images SA, SB differs from that of an image without pixel skipping or pixel mixing. Here, the present embodiment uses the position of a face area in image SA, number of pixels in the horizontal direction of image SB, and pixel pitches of imaging devices of cameras 2A, 2B in the calculations of angle α and field angle γ. Accordingly, even when a face is present at the same position in an image, calculated angle α and field angle γ differ between the case where the pixel skipping or pixel mixing is performed and the case where the pixel skipping or pixel mixing is not performed. Therefore, it is preferable, where pixel skipping or pixel mixing is performed, that the information thereof be included in photographing information C0, and the calculations of angle α and field angle γ be performed by taking into account the pixel skipping or pixel mixing.

Further, in the flowchart of the present embodiment, the description has been made on the assumption that a face is included in images SA, SB, but there may be a case in which a face is not included in images SA, SB. In such a case, a determination may be made whether or not a face is included in images SA, SB, and if not, the processing may be returned to the photographing step.

So far an embodiment of the present invention has been described, but a program for causing a computer to function as units corresponding to subject detection units 7, subject information generation unit 8, and determination unit 9, and to perform processing like that shown in FIG. 6 is another embodiment of the present invention. Further, a computer readable recording medium on which is recorded such a program is still another embodiment of the present invention.

What is claimed is:

1. A multi-eye photographing apparatus comprising:
   a plurality of photographing units for photographing a subject at a plurality of photographing positions to obtain a plurality of images of the subject;
   a subject detection unit for detecting a predetermined subject from a base image which is one of the plurality of images;
   a subject information generation unit for generating subject information which includes information of a position and size of the predetermined subject in the base image;
   a photographing information generation unit for generating photographing information which includes information of a baseline length, convergence angle, and zoom magnification of each of the plurality of photographing units at a time of the photographing; and
   a determination unit for determining whether or not the predetermined subject detected from the base image is included in another image other than the base image based on an angle α and a field angle γ, which are calculated by: employing a zoom magnification of a base photographing unit that obtains the base image, the information regarding the size of the predetermined subject, and an actual size of the predetermined subject, to calculate a distance D1 from the base photographing unit to the predetermined subject; employing the information regarding the position of the predetermined subject, a pixel pitch in a horizontal direction of an imaging element of the base photographing unit, and the zoom magnification of the base photographing unit, to calculate an angle β that represents a direction of the predetermined subject with respect to an optical axis of the base photographing unit; employing the distance D1, the angle β, a baseline length, and a convergence angle, to calculate the angle α that represents a direction of the predetermined subject with respect to an optical axis of another photographing unit; and employing a pixel pitch in a horizontal direction of an imaging element of the another photographing unit, and a zoom magnification of the another photographing unit, to calculate the field angle γ of the another photographing unit, and outputting a result of the determination.

2. The multi-eye photographing apparatus as defined in claim 1, wherein the information of the zoom magnification includes both optical zoom magnification and electronic zoom magnification.

3. A multi-eye photographing apparatus control method, comprising the steps of:
   photographing a subject with a plurality of photographing units at a plurality of photographing positions to obtain a plurality of images of the subject;
   detecting a predetermined subject from a base image which is one of the plurality of images;
   generating subject information which includes information of a position and size of the predetermined subject in the base image;
   generating photographing information which includes information of a baseline length, convergence angle, and zoom magnification of each of the plurality of photographing units at a time of the photographing; and
   determining whether or not the predetermined subject detected from the base image is included in another image other than the base image based on an angle α and a field angle γ, which are calculated by: employing a zoom magnification of a base photographing unit that obtains the base image, the information regarding the size of the predetermined subject, and an actual size of the predetermined subject, to calculate a distance D1 from the base photographing unit to the predetermined subject; employing the information regarding the position of the predetermined subject, a pixel pitch in a horizontal direction of an imaging element of the base photographing unit, and the zoom magnification of the base photographing unit, to calculate an angle β that represents a direction of the predetermined subject with respect to an optical axis of the base photographing unit; employing the distance D1, the angle β, a baseline length, and a convergence angle, to calculate the angle α that represents a direction of the predetermined subject with respect to an optical axis of another photographing unit; and employing a pixel pitch in a horizontal direction of an imaging element of the another photographing unit, and a zoom magnification of the another photographing unit, to calculate the field angle γ of the another photographing unit, and outputting a result of the determination.

4. A non-transitory computer readable recording medium on which is recorded a program for causing a computer to perform a multi-eye photographing apparatus control method, the method comprising the steps of:
   photographing a subject with a plurality of photographing units at a plurality of photographing positions to obtain a plurality of images of the subject;
   detecting a predetermined subject from a base image which is one of the plurality of images;

generating subject information which includes information of a position and size of the predetermined subject in the base image;

generating photographing information which includes information of a baseline length, convergence angle, and zoom magnification of each of the plurality of photographing units at a time of the photographing; and determining whether or not the predetermined subject detected from the base image is included in another image other than the base image based on an angle $\alpha$ and a field angle $\gamma$, which are calculated by: employing a zoom magnification of a base photographing unit that obtains the base image, the information regarding the size of the predetermined subject, and an actual size of the predetermined subject, to calculate a distance D1 from the base photographing unit to the predetermined subject; employing the information regarding the position of the predetermined subject, a pixel pitch in a horizontal direction of an imaging element of the base photographing unit, and the zoom magnification of the base photographing unit, to calculate an angle $\beta$ that represents a direction of the predetermined subject with respect to an optical axis of the base photographing unit; employing the distance D1, the angle $\beta$, a baseline length, and a convergence angle, to calculate the angle $\alpha$ that represents a direction of the predetermined subject with respect to an optical axis of another photographing unit; and employing a pixel pitch in a horizontal direction of an imaging element of the another photographing unit, and a zoom magnification of the another photographing unit, to calculate the field angle $\gamma$ of the another photographing unit, and outputting a result of the determination.

* * * * *